US006476304B2

(12) United States Patent
Uehara

(10) Patent No.: US 6,476,304 B2
(45) Date of Patent: Nov. 5, 2002

(54) INFORMATION PROCESSING SYSTEM WITH GRAPHICAL USER INTERFACE CONTROLLABLE THROUGH VOICE RECOGNITION ENGINE AND MUSICAL INSTRUMENT EQUIPPED WITH THE SAME

(75) Inventor: Haruki Uehara, Shizuoka (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/884,842

(22) Filed: Jun. 19, 2001

(65) Prior Publication Data

US 2002/0007717 A1 Jan. 24, 2002

(30) Foreign Application Priority Data

Jun. 19, 2000 (JP) .......................................... 2000-183670

(51) Int. Cl.$^7$ ................................................. G10H 7/00
(52) U.S. Cl. .............................. 84/600; 84/609; 84/616; 704/231; 704/246; 704/251; 704/270.1
(58) Field of Search ........................... 84/600–604, 609, 84/615–616, 649, 653–654, 477 R, DIG. 6; 704/231, 240–257, 270, 270.1, 275

(56) References Cited

U.S. PATENT DOCUMENTS

| | | | |
|---|---|---|---|
| 5,864,078 A | | 1/1999 | Van Koevering |
| 5,903,871 A | * | 5/1999 | Terui et al. .................. 704/270 |
| 5,908,997 A | | 6/1999 | Arnold et al. |
| 5,956,682 A | * | 9/1999 | Loudermilk et al. ......... 704/270 |
| 6,205,428 B1 | * | 3/2001 | Brown et al. ................ 704/270 |
| 6,223,158 B1 | * | 4/2001 | Goldberg ..................... 704/252 |
| 6,232,539 B1 | * | 5/2001 | Looney et al. ................. 84/609 |
| 6,266,640 B1 | * | 7/2001 | Fromm ........................ 704/246 |
| 6,308,158 B1 | * | 10/2001 | Kuhnen et al. .............. 704/275 |

* cited by examiner

Primary Examiner—Marlon T. Fletcher
(74) Attorney, Agent, or Firm—Morrison & Foerster LLP

(57) ABSTRACT

A musical instrument is computerized for electronically generating tones, and an information processing subsystem assists users selectively to change the attributes of the tones, wherein the information processing subsystem includes a speaker recognition engine for identifying a player with one of registered users and a graphical user interface transferring a digital image signal representative of a picture customized by the registered user to a display unit so that the user can check the attribute during the performance.

30 Claims, 13 Drawing Sheets

Your voice has been registered.
Please memorize your identification code.

User Name : TARO

Identification Code : ID 1

Fig. 7

INFORMATION PROCESSING SYSTEM WITH GRAPHICAL USER INTERFACE CONTROLLABLE THROUGH VOICE RECOGNITION ENGINE AND MUSICAL INSTRUMENT EQUIPPED WITH THE SAME

FIELD OF THE INVENTION

This invention relates to an information processing technology available for musical instruments and, more particularly, to an information processing system associated with an object-oriented user interface for musicians and a musical instrument equipped with the information processing system.

DESCRIPTION OF THE RELATED ART

A graphical user interface is popular to computer users, and permits the users to manage a large amount of data information as well as various kinds of computer programs. The graphical user interface produces visual images called "icons" on a display screen. When the user starts a computer program or accesses a data file, he or she moves a pointer to an icon representative of the computer program or a data file by sliding a mouse, and clicks the mouse. Then, the computer program starts to run on the personal computer system, or the data file is open. Thus, the user easily manipulates the personal computer system through the graphic user interface.

There are various tools with which the computer user customizes a new picture. The user designs a new picture and visual images by means of the tools, and adds the new picture to the library.

A large number of visual images are usually required for the communication between the user and the personal computer system. The visual images are grouped into plural pictures, and appropriate category icons are respectively assigned to the pictures. The user firstly selects one of the pictures by clicking the category icon assigned thereto. Otherwise, a keyboard may be used for the selection. Then, the data processing unit produces the selected picture on the screen. Next, the user selects one of the visual images on the picture by manipulating the mouse so as to input a piece of data information or give an instruction to the data processing unit. Thus, the user stepwise accesses the objective visual image by manipulating the mouse or the keyboard. In case where the user has customized a new picture, the new picture is also accessible through the manipulation of the mouse or the keyboard.

However, someone such as a physically handicapped person feels it difficult to manipulate the mouse or the keyboard. A voice recognition technology is helpful for the physically handicapped person. The voice recognition technology is introduced into the personal computer system, and offers a man-machine interface to the physically handicapped person.

Another application of the voice recognition technology is an automatic answer network system. The automatic answer network system is a combination of a mainframe computer system and a telephone network. A lot of telephone subscribers concurrently access the database through the telephone network, and the mainframe computer answers the users requests. While a person is speaking through telephone, he or she needs to hold the receiver by hand. This means that he or she feels it difficult to manipulate the keyboard. The mainframe computer has the man-machine interface realized through the voice recognition and response technologies, and specifies the piece of the data information requested by each subscriber. Thus, the voice recognition technology is fairly popular to the computer user.

A speaker recognition is yet another application field of the voice recognition technology. When the speaker pronounces a word or words, the speaker recognition system extracts a characteristic pattern from his or her pronunciation, and identifies the speaker with one of the registered persons. The speaker recognition technology is applied to an electronic key for security, telephone banking, a remote access to a computer system.

Several kinds of musical instrument have been computerized. An electric keyboard is a typical example of the computerized musical instrument. A data processing system is incorporated in the electric keyboard together with key switches and a tone generator. The data processing system has a manipulating board, and a player gives instructions to the data processing system through the manipulating board before his or her performance. The data processor responds to the instructions for changing properties of the electronic tones such as, for example, a timbre and volume. While the player is fingering on the keyboard, the personal computer system processes pieces of music data information representative of the performance, and instructs the tone generator to produce the electronic tones. Another personal computer system serves as a tutor for a beginner, and assists the beginner in a practice of fingering. Thus, the personal computer system offers various kinds of service to musicians.

In these circumstances, the graphic user interface makes the musicians communicate with the personal computer system easily. FIG. 1 shows a picture produced on a screen of a display unit incorporated in the prior art personal computer system for musicians. Various visual images are arranged in the picture. A visual image C1 is representative of ten keys, and another visual image C2 has an image of an indicator. Yet another visual image C3 is like a button switch. The visual images serve as if real ten keys and real button switches are provided on the screen. When the user clicks the visual images, numerals are input to the data processing unit, and instructions are given to the data processing unit. The needle of the indicator is indicative of the current value of a physical quantity such as, for example, the volume of tones to be generated. The personal computer system notifies the current status to the user through the indicators.

A prior art electronic musical instrument with a built-in computer system is disclosed in U.S. Pat. No. 5,864,078. The computer system has a flat screen display embedded in a music stand. A touch control overlay is provided on the flat screen display. The user gives controllable parameters through the touch control overlay. In this instance, the touch control overlay serves as the man-machine interface.

The built-in computer systems already known are manipulated by the players or musicians before their performance. Most musicians are not physically handicapped, and do not find the manipulating panel and the touch control overlay inconvenient. For this reason, the user gives instructions and music parameters through the interface to be manipulated by his or her hand.

Although a computerized keyboard musical instrument is equipped with a microphone, it is limited to a man-machine interface for recording. An example of the computerized keyboard musical instrument equipped with a microphone is disclosed in U.S. Pat. No. 5,908,997. The prior art computerized keyboard musical instrument has a multimedia audio subsystem, and the microphone forms a part of the multimedia audio subsystem. The user inputs his or her voice through the microphone into the multimedia audio subsystem. The inventors describe the reason why the user uses the microphone as "the microphone 84 can be connected to the system for recording, karaoke and other musical voice input applications" (see column 9, lines 52 to 54). The prior art computerized keyboard musical instrument is equipped with a graphical user interface, and the controllable parameters are adjusted through the graphic user interface.

The manipulating panel and the graphical user interface are popular in the field of computerized musical instruments, and the user satisfies the manipulating panel and the graphic user interface. However, while the musician is playing a tune with the computerized keyboard musical instrument, he or she has to continue the fingering. As described hereinbefore, the graphic user interface has a large number of visual images, and it is impossible to produce all the visual images on the screen concurrently. This means that the user accesses the target visual image by repeating the manipulation on the screen. However, it is difficult to repeat the manipulation on the graphic user interface during the performance. This means that the musician can not change the instruction and/or parameters after starting the performance.

SUMMARY OF THE INVENTION

It is therefore an important object of the present invention to provide a data processing system, which has a graphic user interface manipulative by a user who has his or her hands full.

It is another important object of the present invention to provide a musical instrument, which is equipped with the data processing system.

To accomplish the object, the present invention proposes to combine a picture with a speaker through a voice recognition system.

In accordance with one aspect of the present invention, there is provided an information processing system comprising a memory having plural addressable locations where identification codes respectively assigned to plural users and plural pieces of visual data information representative of first pictures respectively owned by the plural users are stored, a voice-to-signal converter converting a pronunciation of a speaker to a first electric signal, a voice recognition engine connected to the voice-to-signal converter, responsive to the first electric signal so as to identify the speaker with one of the plural users and producing a second electric signal representative of the aforesaid one of the plural users, a visual display unit responsive to a third electric signal for selectively producing the first pictures, and a graphical user interface connected to the voice recognition engine, the memory and the visual display unit, responsive to the second electric signal so as to produce a fourth electric signal representative of the identification code assigned to the aforesaid one of the plural users and supplying the fourth electric signal to the memory for transferring the third electric signal representative of the first picture owned by the aforesaid one of the plural users to the visual display unit.

In accordance with another aspect of the present invention, there is provided an information processing system comprising a memory having at least one addressable location where an identification code assigned to a user and a piece of visual data information representative of a certain picture customized by the plural user are stored, a voice-to-signal converter converting a pronunciation of a speaker to a first electric signal, a voice recognition engine connected to the voice-to-signal converter and responsive to the first electric signal so as to produce a second electric signal representative of the user when the speaker is identified with the user, a visual display unit responsive to a third electric signal for selectively producing pictures, and a graphical user interface connected to the voice recognition engine, the memory and the visual display unit, responsive to the second electric signal so as to produce a fourth electric signal representative of the identification code assigned to the user and supplying the fourth electric signal to the memory for transferring the third electric signal representative of the certain picture to the visual display unit.

In accordance with yet another aspect of the present invention, there is provided an information processing system used for a musical instrument for assisting a player in selecting at least one attribute of tones to be generated, and the information processing system comprises a memory having plural addressable locations where identification codes respectively assigned to plural users and plural pieces of visual data information representative of first pictures respectively owned by the plural users are stored, each of the first pictures including at least one visual image indicating the current state of the at least one attribute, a voice-to-signal converter converting a pronunciation of the player to a first electric signal, a voice recognition engine connected to the voice-to-signal converter, responsive to the first electric signal so as to identify the player with one of the plural users and producing a second electric signal representative of the aforesaid one of the plural users, a visual display unit responsive to a third electric signal for selectively producing the first pictures and a graphical user interface connected to the voice recognition engine, the memory and the visual display unit, responsive to the second electric signal so as to produce a fourth electric signal representative of the identification code assigned to the aforesaid one of the plural users and supplying the fourth electric signal to the memory for transferring the third electric signal representative of the first picture owned by the aforesaid one of the plural users to the visual display unit.

In accordance with still another aspect of the present invention, there is provided a musical instrument for producing tones, and the musical instrument comprises plural manipulators for specifying notes of a scale, a tone generating system responsive to fingering on the plural manipulators for generating tones with the notes specified through the fingering and an information processing system connected to the tone generating system and including a memory having plural addressable locations where identification codes respectively assigned to plural users and plural pieces of visual data information representative of first pictures respectively owned by the plural users are stored, each of the first pictures including at least one visual image indicating the current state of the at least one attribute of the tones, a voice-to-signal converter converting a pronunciation of the player to a first electric signal, a voice recognition engine connected to the voice-to-signal converter, responsive to the first electric signal so as to identify the player with one of the plural users and producing a second electric signal representative of the aforesaid one of the plural users, a visual display unit responsive to a third electric signal for selectively producing the first pictures and a graphical user interface connected to the voice recognition engine, the memory and the visual display unit, responsive to the second electric signal so as to produce a fourth electric signal representative of the identification code assigned to the aforesaid one of the plural users and supplying the fourth electric signal to the memory for transferring the third electric signal representative of the first picture owned by the aforesaid one of the plural users to the visual display unit.

BRIEF DESCRIPTION THE DRAWINGS

The features and advantages of the data processing system and the musical instrument will be more clearly understood from the following description taken in conjunction with the accompanying drawings in which:

FIG. 7 is a view showing messages produced on the display unit when registration is completed;

DESCRIPTION OF THE PREFERRED EMBODIMENTS

First Embodiment

Figure 1:
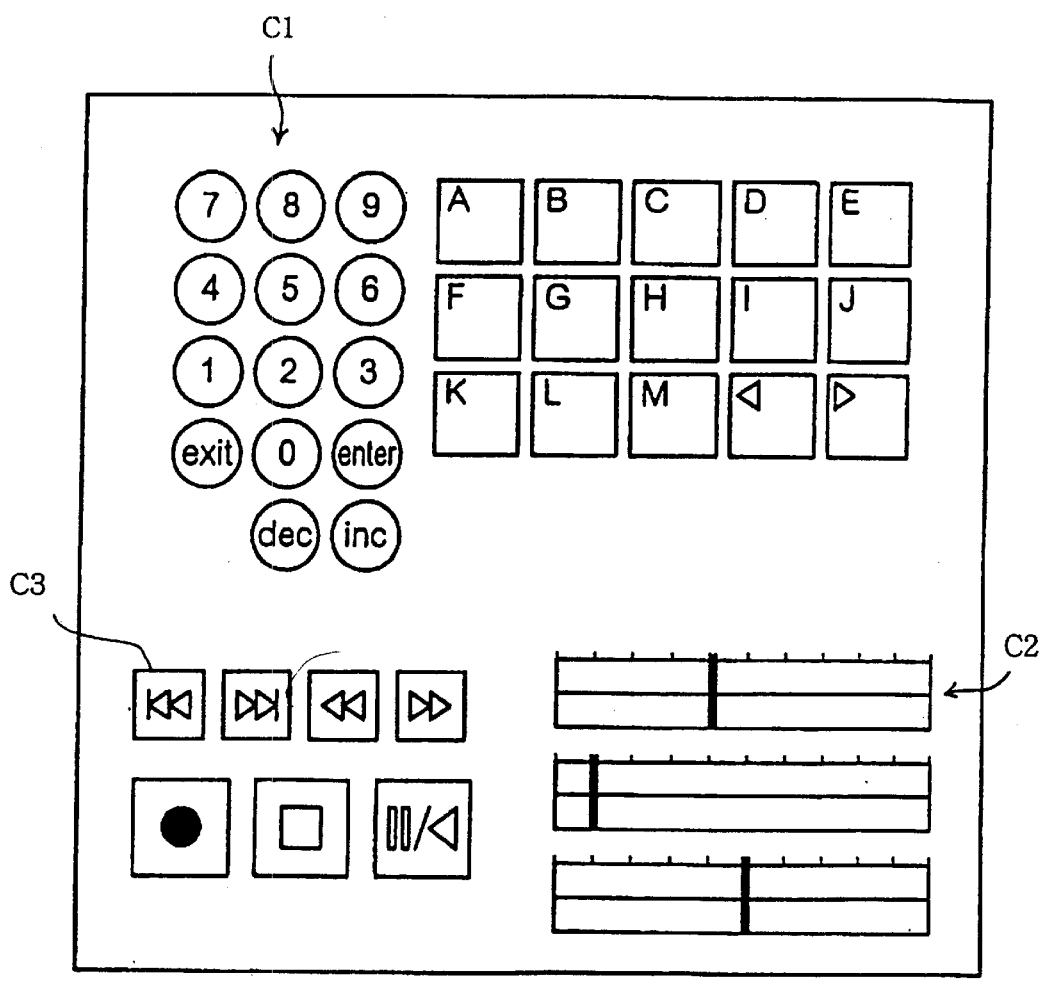
FIG. 1 is a front view showing the visual images produced on the screen of the display forming a part of the prior art data processing system.
Figure 2:
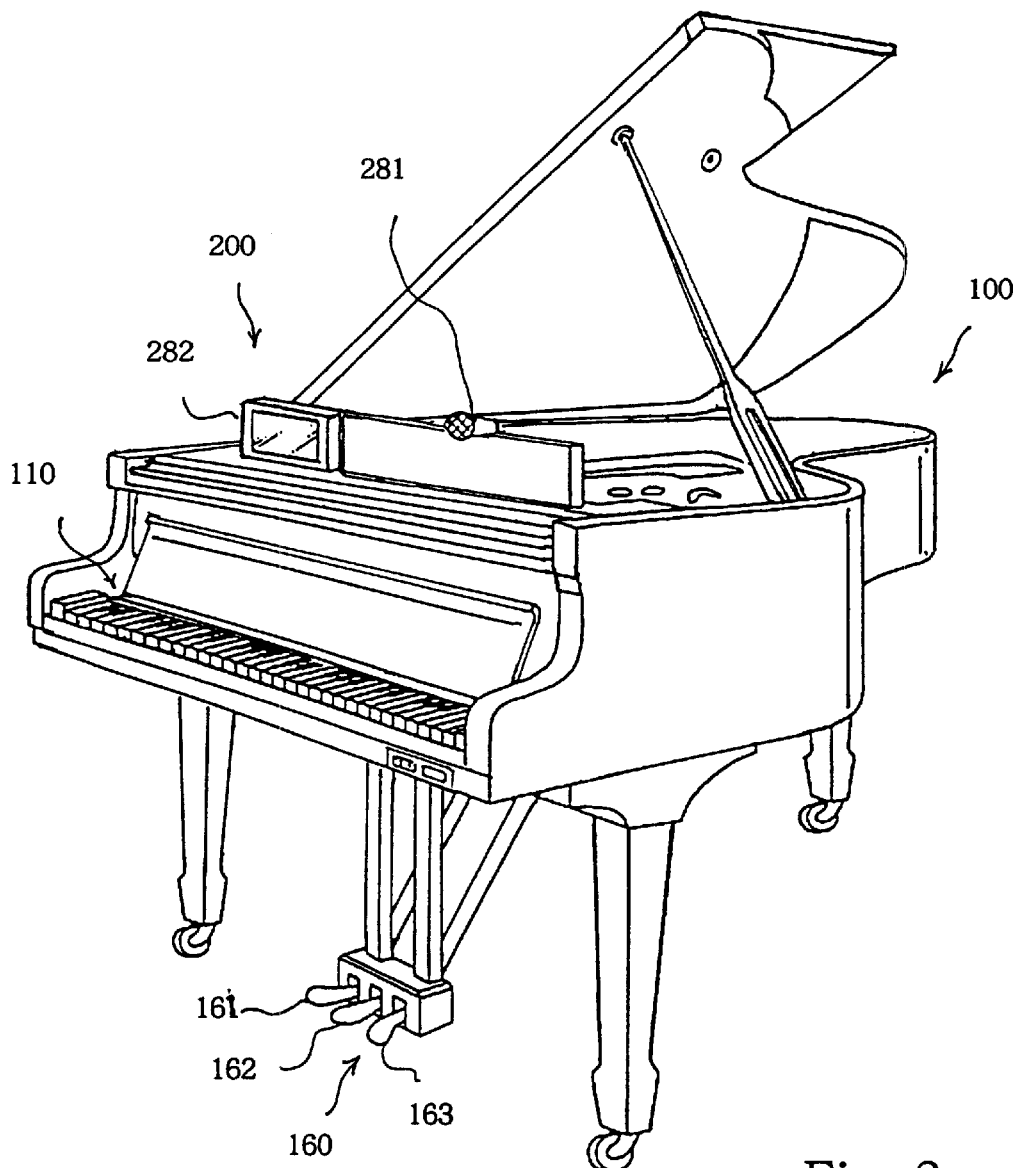
FIG. 2 is a perspective view showing the appearance of an automatic player piano according to the present invention.
Figure 3:
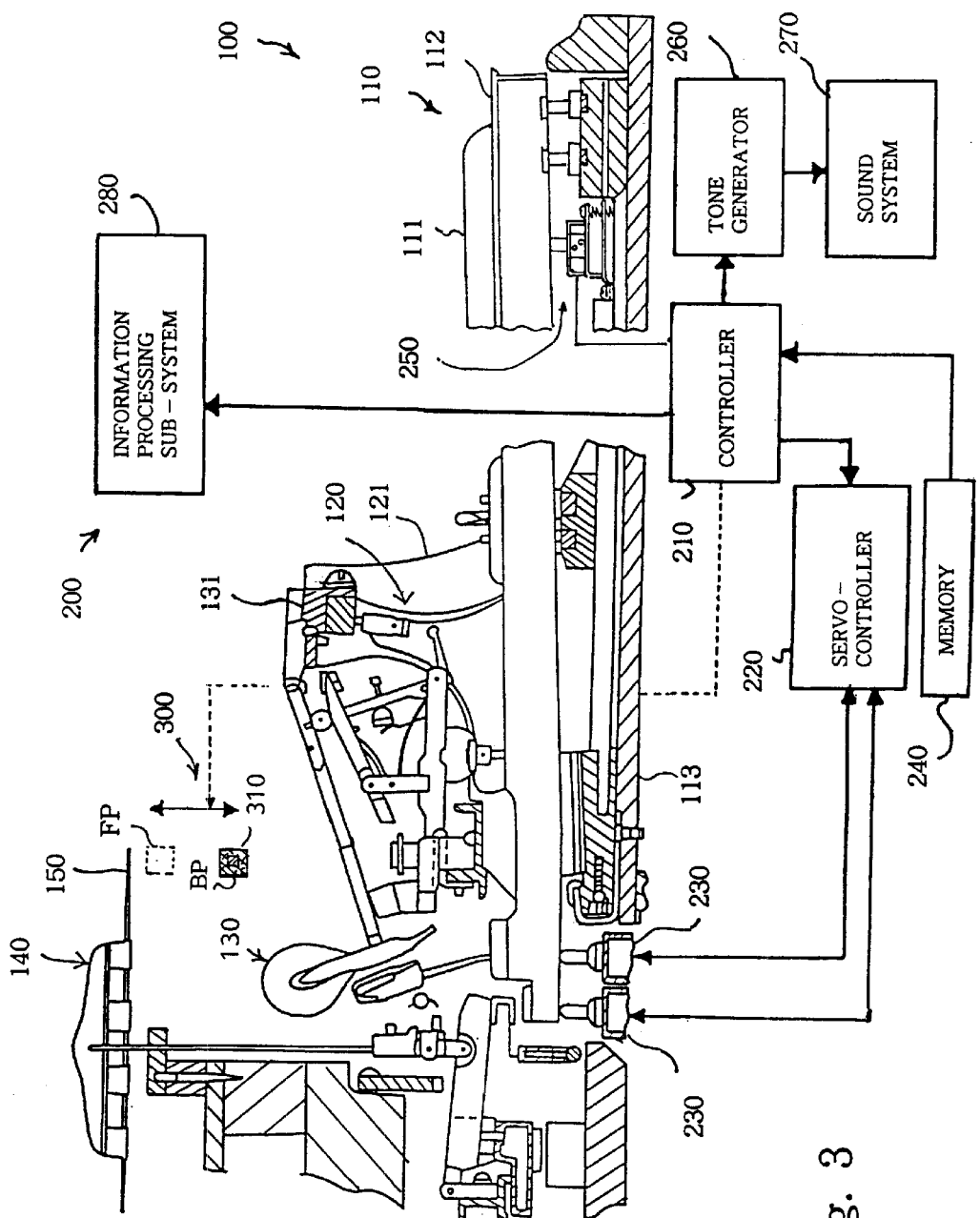
FIG. 3 is a cross sectional side view showing the arrangement of essential parts of the automatic player piano and the circuit configuration of an electronic system.

Referring to FIG. 2 of the drawings, an automatic player piano embodying the present invention largely comprises an acoustic piano 100, an electronic system 200 and a silent system 300. In the following description, the word "front" is indicative of a relative position closer to a player fingering on the acoustic piano 100 than a "rear" position. The word "fore-and-aft" is indicative of a direction passing through the front position and the rear position, and "lateral" direction is perpendicular to the fore-and-aft direction. The acoustic piano 100 and the silent system 300 are similar to those incorporated in a prior art automatic player piano, and only a brief description is hereinbelow made on the acoustic piano 100 and the silent system 300.

Acoustic Piano

A standard grand piano is used as the acoustic piano 100, and a human pianist or the electronic system 200 plays a tune on the acoustic piano 100. The acoustic piano 100 includes a keyboard 110, action mechanisms 120, hammer assemblies 130, dampers 140, sets of strings 150 and a pedal mechanism 160. Black keys 111 and white keys 112 are incorporated in the keyboard 110, and are rotatably arranged over a key bed 113. The action mechanisms 120 are provided over the associated black/white keys 111/112, and are supported by action brackets 121. The black/white keys 111/112 are connected at capstan buttons to the associated action mechanisms 120, respectively. The hammer assemblies 130 are rotatably supported by a shank flange rail 131, which in turn is supported by the action brackets 121. The sets of strings 150 are stretched over the hammer assemblies, and are to be struck with the associated hammer assemblies 130. The dampers 140 are provided at the back of the keyboard 110, and are actuated by the associated black/white keys 111/112. The dampers 140 are held in contact with and spaced from the associated sets of strings 150 so as to permit the associated sets of strings to vibrate while the associated black/white keys 112/111 is moved from or to the rest positions. The pedal mechanism 160 includes a soft pedal 161, a muffler pedal 162 and a damper pedal 163. The soft pedal 161, the muffler pedal 162 and the damper pedal 163 are selectively actuated so as to impart effects to the piano tones.

Assuming now that a white key 112 starts from the rest position toward the end position, the white key 112 actuates the associated action mechanism 120, and spaces the associated damper 140 from the set of strings 150. The set of strings 150 gets ready to vibrate. The action mechanism 120 slowly rotates the associated hammer 130, and escapes from the hammer 130. The escape gives rise to free rotation of the hammer 130, and the hammer 130 strikes the associated set of strings 140. The hammer 130 rebounds on the set of strings 150. When the white key 112 is released, the white key 112 starts to return to the rest position. The released key 112 allows the damper 140 to be brought into contact with the set of strings 150 on the way toward the rest position, and the damper 140 absorbs the vibrations of the strings 150. The hammer 130 is brought into contact with the associated action mechanism 120 before the released key 112 reaches the rest position.

Silent System

The silent system 300 includes a hammer stopper 310 and a suitable actuator such as an electric motor (not shown). The hammer stopper 310 is changed between a free position FP and a blocking position BP. While the hammer stopper 310 is staying at the free position FP, the hammer stopper 310 is out of the trajectories of the hammers 130, and the hammers 130 strike the associated sets of strings 150 as described hereinbefore. On the other hand, when the hammer stopper 310 is changed to the blocking position BP, the hammer stopper 310 enters the trajectories of the hammers 130. Although the action mechanisms 120 escape from the associated hammers 130, the hammers 130 rebound on the hammer stopper 310 before reaching the associated sets of strings 150, and the hammer stopper 310 keeps the associated sets of strings 150 silent. The electronic system 200 is responsive to the key motions, and generates electronic tones instead of the piano tones as will be hereinlater described in detail.

Electronic System

The electronic system 200 realizes three major functions, i.e., an automatic playing, an electronic tone generation and a support to the former functions. The electronic system 200 plays a tune on the acoustic piano 100 through the automatic playing function, and generates the electronic tones corresponding to the piano tones through the electronic tone generating function. The electronic system 200 accepts user's instructions through the supporting function.

Automatic Playing Function

In order to realize the automatic playing function, the electronic system 200 comprises a controller 210, a servo-controller 220, an array of solenoid-operated key actuators 230 and a memory 240. The controller 210 includes a data processor, a program memory, a working memory, a bus system interconnecting the former components and suitable interfaces. Plural computer programs are. stored in the program memory for the functions, and the working memory offers temporary data storage to the data processor. The electric motor (not shown) for the hammer stopper 310, the memory 240 and the servo-controller 220 are connected to the interface of the controller 210. The memory 240 includes a suitable information storage medium such as, for example, a magnetic disc or an optical disc and a disc controller/driver. The disc controller/driver is connected to the interface of the controller 240, and reads out music data codes from the information storage medium. The servo-controller 220 is connected between the controller 210 and the array of solenoid-operated key actuators 230, and the controller 210 instructs the servo-controller 220 to selectively energize the solenoid-operated key actuators 230 through the control data codes. The array of solenoid-operated key actuators 230 is provided under the keyboard 110. When the servo-controller 220 energizes a solenoid-operated key actuator 230 with driving current signals, the solenoid-operated key actuator 290 projects the plunger upwardly, and moves the associated black/white key 111/112 without fingering. The controller 210 instructs the electric motor (not shown) to change the hammer stopper 310 between the free position FP and the blocking position BP.

One of the computer programs is stored for the automatic playing function. While the computer program is running on the data processor, the data processor transfers a set of music data codes representative of a performance from the memory 240 to the working memory, and the data processor supplies the control data codes representative of target positions on the trajectories of the black/white keys 111/112 to the servo-controller 220 at appropriate times so as to move the solenoid-operated key actuators 230 for the playback. The solenoid-operated key actuators 230 are equipped with built-in sensors, and feedback signals are supplied to the built-in sensors to the servo-controller 220 for modifying the driving current signals.

Electronic Tone Generating Function

The electronic system 200 further comprises key sensors 250, a tone generator 260 and a sound system 270 for the electronic tone generating function. The controller 210 cooperates with the key sensors 250 and the tone generator 260 for generating the electronic tones. The key sensors 250 are provided under the black/white keys 111/112, and supply key position signals representative of current key positions of the associated black/white keys 111/112 to the controller 210. The data processor periodically checks the key position signals to see whether or not any one of the black/white keys 111/112 changes the current key position. When the controller 210 notices a black/white key 111/112 moving, the controller 210 specifies the black/white key 111/112, and calculates the key velocity. The key velocity is proportional to the loudness of the electronic tone to be generated. The time comes when the sound system generates the electronic tone. Then, the data processor supplies the music data codes representative of the electronic tone to be generated to the tone generator 260. Then, the tone generator 260 tailors an audio signal on the basis of the music data codes, and supplies it to the sound system 270. Then, the audio signal is converted to the electronic tone.

Supporting Function

The electronic system 200 further comprises an information processing subsystem 280 for the supporting function. The information processing subsystem 280 is connected to the controller 210, and conveys user's wishes to the controller 210. The controller 210 complies with the user's wishes, and controls the servo-controller 220 and the array of solenoid-operated key actuators 230 for the automatic playing function as well as the tone generator 260 for the electronic tone generating function.

Information Processing Subsystem

Figure 4:
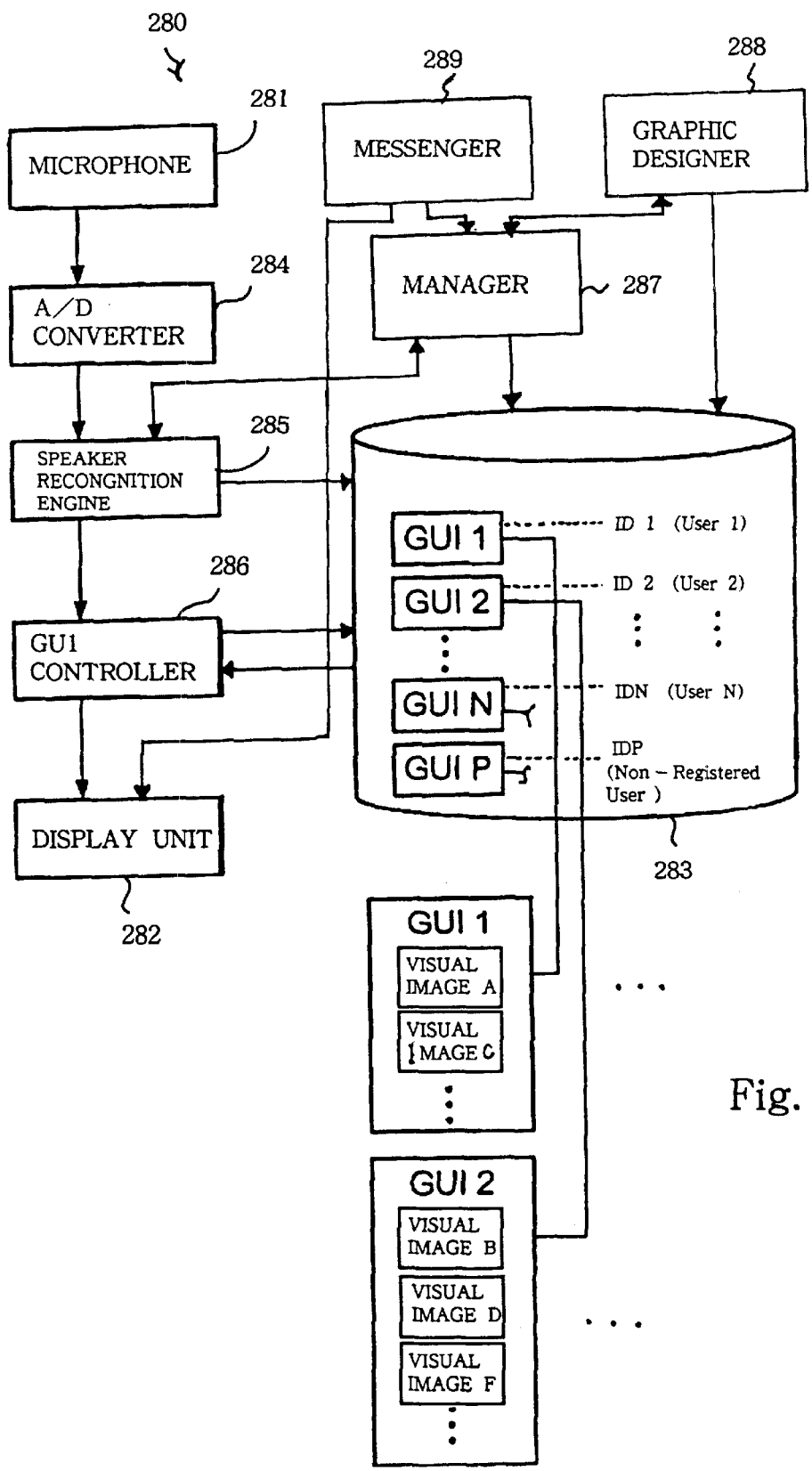
FIG. 4 is a block diagram showing the arrangement of components incorporated in an information processing subsystem.

FIG. 4 shows the arrangement of system components incorporated in the information processing subsystem 280. The information processing subsystem 280 includes a microphone 281, a display unit 282, a database 283, an analog.-to-digital converter 284, a speaker recognition engine 285 and a GUI controller 286. The microphone 281 has a certain directivity, and is arranged in such a manner as to be directed to a pianist sitting in front of the keyboard 110 (see FIG. 2). When the pianist pronounces words, the microphone 281 converts the voice to an analog voice signal representative of his pronunciation. The microphone 281 is connected to the analog-to-digital converter 284, and the analog voice signal is input to the analog-to-digital converter 284. The analog-to-digital converter 284 converts the analog voice signal to a digital voice signal. The analog-to-digital converter 284 is connected to the speaker recognition engine 285, and the digital voice signal is input to the speaker recognition engine 285.

The speaker recognition engine 285 registered speakers as users, respectively. Speakers respectively have unique characteristic patterns on their pronunciations. The speaker recognition engine. 285 determined the unique characteristic patterns, and memorized the unique characteristic patterns together with identification codes respectively assigned to the users. When the registration was completed, the speaker recognition engine 285 notified the identification code to the database 283.

In order to support the registration, the information processing subsystem 280 further includes a manager 287, a graphic designer 288 and a messenger 289. These components 287, 288 and 289, the voice recognition engine 285 and the GUI controller 286 is implemented by software, hardware or the mixture therebetween. The messenger 289 may be implemented by a touch-sensitive panel attached to the display unit 282 and a computer program. The touch-sensitive panel may be replaced with a keyboard or a switch panel. When a user wants to customize a new picture for himself or herself, the user requests the messenger 289 to transfer his or her request to the manager 287. Then, the manager 287 instructs the graphic designer 288 to assist the user in the origination. When the user completes a new picture, the manager 287 transfers pieces of image data information representative of the new picture to the database 283, and instructs the speaker recognition engine 285 to assign an identification code to the user. The manager 287 stores the pieces of image data information and the identification code in a memory location not assigned yet.

Upon receiving the digital voice signal, the speaker recognition engine 285 analyzes the digital voice signal, and extracts a characteristic pattern representative of characteristics of the pronunciation from the digital voice signal. Characteristic patterns have been already registered in the speaker recognition engine 285 for users, and the speaker recognition engine 285 calculates the similarity between the given characteristic pattern and each of the characteristic patterns already registered. The speaker recognition engine 285 identifies the speaker with one of the users already registered, or determines that the speaker is a non-registered user. The speaker recognition engine 285 is further connected to the GUI (Graphic User Interface) controller 286, and supplies a digital data signal representative of an identification code ID1, ID2, . . . IDN of the speaker.

The GUI controller 286 is connected to the database 283 and the display unit 282. Relation between the identification codes ID1, ID2, . . . , IDN and IDP and pictures GUI1, GUI2, . . . GUIN and GUIP and relation between the pictures and their contents are stored in the database 283. N and P are natural numbers, and natural number P is greater than natural number N. The picture GUI1 is customized by a user ID1, and visual images A, C, . . . are to be produced on the picture GUI1. Similarly, the picture GUI2 is customized by another user ID2, and contains visual images B, D, F, . . . .

The GUI controller 286 searches the database 283 for the picture GUI1, GUI2, . . . or GUIN customized by the speaker, and transfers digital image signal representative of the picture to the display unit 282. It the speaker is the non-registered user, the identification code IDP is assigned to the nonregistered user, and the GUI controller 286 transfers the digital image signal representative of a standard picture GUIP to the display unit 282.

The display unit 282 is, by way of example, implemented by a flat display panel such as, for example, a liquid crystal display panel. The display unit 282 selectively produces the picture GUI1, . . . , GUIN or GUIP on the screen.

Figure 5A:
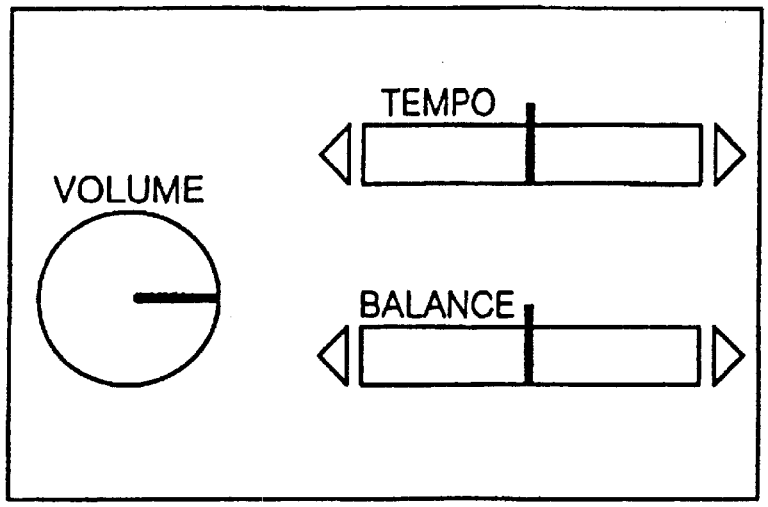
FIGS. 5A and 5B are views showing pictures produced on a screen of a display.
Figure 5B:
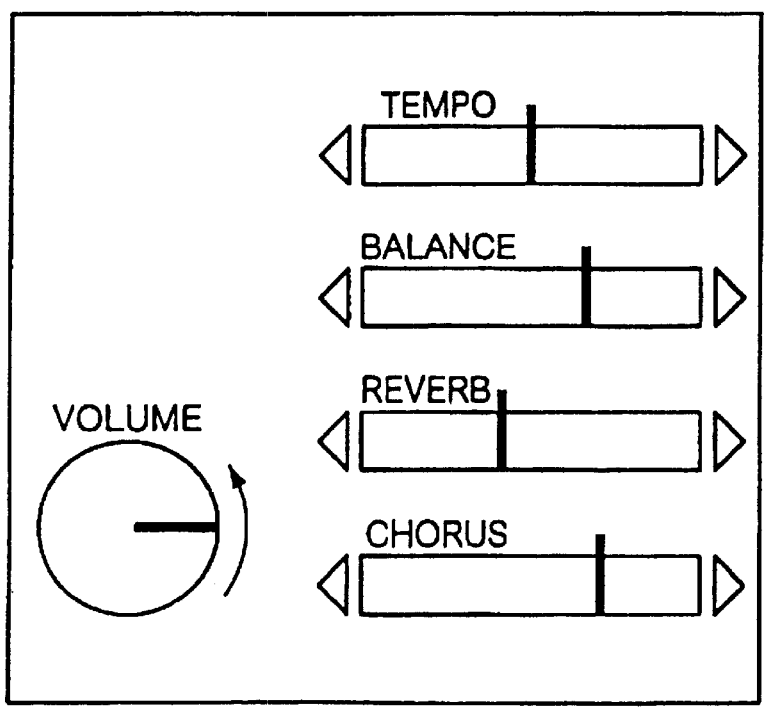

FIGS. 5A and 5B show the pictures produced on the screen. Visual images "VOLUME", "TEMPO" and "BALANCE" form parts of the standard picture GUIP shown in FIG. 5A, and the user gives instructions for controllable parameters through the visual images. The screen may be overlain by a touch control panel, or a pointer may be moved on the picture by sliding a mouse. The image "VOLUME" is like a volume controller, and the volume controller has a dial. The image "TEMPO" is like a regulator for the tempo, and the other image "BALANCE" is like a regulator for balance between the piano tone and the electronic tones. The regulators have respective needles. The user virtually turns a dial of the volume controller for varying the volume of the electronic tones, and virtually moves the needles for adjusting the tempo and the balance to optimum values. When the speaker recognition engine 285 identifies the speaker with non-registered user, the GUI controller 286 transfers the digital image signal representative of the standard picture GUIP from the database 283 to the display unit 282.

FIG. 5B shows one of the pictures GUI1 to GUIN customized by a user. The picture shown in FIG. 5B is assumed to be customized by the user assigned the identification code ID1. Two images "REVERB" and "CHORUS" are added to the standard picture GUIP. The standard picture GUIP did not satisfy the user. The user added two visual images "REVERB" and "CHORUS" to the standard picture, and customized the picture shown in FIG. 5B. The visual image "REVERB" is like a regulator with a movable needle. The name "REVERB" suggests that the depth of reverb is adjustable through the visual image. Similarly, the name "CHORUS" suggests that the degree of chorus effect is adjustable through the visual image. When the speaker recognition engine identifies the speaker with the registered user, the GUI controller 286 transfers the digital image signal representative of the picture shown in FIG. 5B from the database 283 to the display unit 282.

Speaker Recognition Engine

Figure 6:
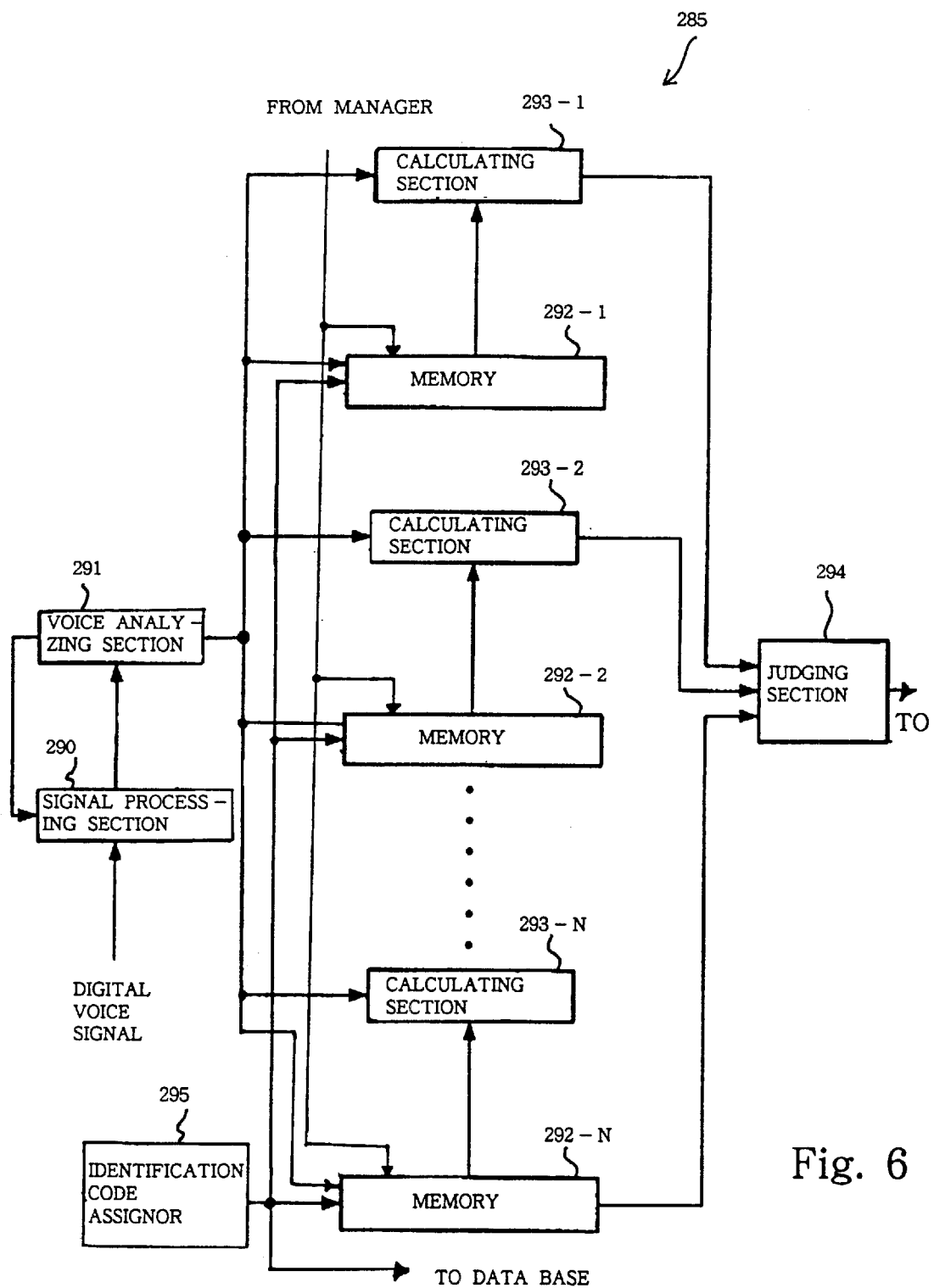
FIG. 6 is a block diagram showing the arrangement of a speaker recognition engine.

FIG. 6 shows the arrangement of the speaker recognition engine 285. The speaker recognition engine 285 includes a signal processing section 290, a voice analyzing section 291, memories 292-1, 292-2, . . . and 292-N, calculating sections 293-1, 293-2, . . . and 293-N, a judging section 294 and an identification code assignor 295. The analog-to-digital converter 284 is connected to the signal processing section 290, and the digital voice signal is supplied from the analog-to-digital converter 284 to the signal processing section 290. The signal processing section 290 carries out signal processing on the digital voice signal, and supplies a digital voice data signal to the voice analyzing section 291. The voice analyzing section 291 instructs the signal processing section 290 to change the signal processing through a digital control signal.

The voice analyzing section 291 carries out an acoustic analysis, and determines a characteristic voice pattern on pronunciation of a speaker. The voice analyzing section 291 supplies a digital voice pattern signal representative of the characteristic voice pattern to the calculating sections 293-1 to 293-N.

The memories 292-1 to 292-N are respectively connected to the calculating sections 293-1 to 293-N. The characteristic voice patterns have been already stored in the memories 292-1 to 292-N for the registered users together with the identification codes given thereto. When the characteristic voice patterns were stored in the memories 292-1 to 292-N, the identification code assignor 295 10 assigned the identification codes ID1, ID2, . . . and IDN to the registered users, and the identification codes ID1, ID2, . . . and IDN were stored in the memories 292-1 to 292-N together with the characteristic voice patterns. The identification code assignor 295 does not assign any identification code to plural users. Thus, the identification codes ID1 to IDN are managed by the identification code assignor 295. When the identification code assignor 295 newly assigns an identification code to a user, the identification code assignor 295 notifies the identification code to the database 283, and the identification code is linked with a picture customized by the user.

When the voice analyzing section 291 distributes the characteristic voice pattern to the calculating sections 293-1 to 293-N, the calculating sections 293-1 to 293-N read out the characteristic voice patterns and the identification codes ID1 to IDN from the associated memories, and calculate the similarity between the given characteristic voice pattern and the stored characteristic voice pattern. Upon completion of the calculation, the calculating sections 293-1 to 293-N supply digital data signals representative of the calculated values of similarity and the identification codes to the judging section 294.

The judging section 294 compares the values of similarity with one another to see whom the speaker resembles in voice pattern closely. When one of the registered users is selected, the judging section 294 checks the similarity to see whether or not the calculated value is equal to or greater than a critical value. If the answer is given positive, the judging section 294 identifies the speaker with the user. On the other hand, if the answer is given negative, the judging section 294 does not identify the speaker with anyone, and determines that the speaker is a non-registered user. Finally, the judging section 294 supplies a digital data signal representative of the identification code assigned to the spedified user or the non-registered user to the GUI controller 286.

Assuming now a new user whose name is Taro wants to customize his picture, he orders the messenger 289 to convey his wish to the manager 287. The manager 287 requests the messenger 289 to prompt him to give his name. The user gives his name "Taro" to the messenger 289, and the messenger 289 conveys his name to the manager 287. The manager 287 memorizes his name "Taro".

Subsequently, the manager 287 requests the messenger 289 to prompt him to pronounce several words, and instructs the speaker recognition engine 285 to register a characteristic voice pattern in a free memory 292-1 to 292-N. The user directs his face to the microphone 281, and pronounces several words. The user continues the pronunciation for about 20 seconds. The microphone 281 generates the analog voice signal representative of his pronunciation, and supplies the analog voice, signal to the analog-to-digital converter 284. The analog-to-digital converter 284 converts the analog voice signal to the digital voice signal, and supplies the digital voice signal to the speaker recognition engine 285. After the signal processing, the voice analyzing section 291 extracts a characteristic voice pattern from his pronunciation. The memory 292-1 is assumed to be free. Then, the characteristic voice pattern is stored in the free memory 292-1. The identification code assignor 295 assigned an identification code ID1 to the characteristic voice pattern, which has not been assigned to any user, to the user, and the identification code ID1 is also stored in the memory 292-1. Finally, the speaker recognition engine 285 reports the registration to the manager 287.

The manager 287 instructs the speaker recognition engine 285 to transfer the identification code ID1 to the database 283, and gives an address not assigned yet to the database 283. The speaker recognition engine 285 supplies a digital data signal representative of the identification code ID1 to the database 283, and the identification code ID1 is stored at the given address.

When the identification code ID1 is stored, the manager 287 requests the messenger 289 to notify the completion of the registration to the user through a picture shown in FIG. 7. The messenger 289 produces the picture on the display unit 282. When the user confirmed the registration, the manager 287 requests the graphic designer 288 to assist the user in origination of a picture. The user customizes a picture with the assistance of the graphic designer 288, and instructs the messenger 289 to convey his message that he has completed the new picture to the manager 287.

When the user's message reaches the manager 287, the manager 287 requests the messenger 289 to beg the user to input his identification code. The messenger 289 produces a message "Please teach me your identification code" on the display unit 282. The user gives his identification code ID1 to the messenger 289, and the messenger 289 conveys the identification code ID1 to the manager 287.

Upon reception of the identification code ID1, the manager 287 requests the graphic designer 288 to transfer the pieces of image data information representative of the new picture GUI1 to the database 283, and gives the database 283 an address linked with the address where the identification code ID1 has been already stored. The pieces of image data information is stored at the address, and the picture GUI1 is linked with the identification code ID1 in the database 283.

The user Taro is assumed to be going to play a tune on the keyboard 110 through the electronic tones. The user pronounces words "initial set-up" toward the microphone 281. The manager 287 may request the messenger 289 to produce a prompt message on the display unit 282.

The microphone 281 generates the analog voice signal representative of the pronunciation, and supplies the analog voice signal to the analog-to-digital converter 284. The analog-to-digital converter 284 converts the analog voice signal to the digital voice signal, and supplies the digital voice signal to the speaker recognition engine 285. The speaker recognition engine 285 identifies the speaker with one of the registered users, or determines that the speaker is a non-registered user as follows.

The digital voice signal representative of the pronunciation is supplied through the signal processing section 290 to the voice analyzing section 291, and the voice analyzing section 291 extracts the characteristic voice pattern from the pronunciation. The voice analyzing section 291 produces the digital voice pattern signal representative of the characteristic voice pattern, and distributes the digital voice pattern signal to the calculating sections 293-1 to 293-N. The calculating sections 293-1 to 293-N read out the characteristic voice patterns and the identification codes from the associated memories 292-1 to 292-N, respectively, and calculates the similarity between the characteristic voice pattern of the speaker and the characteristic voice patterns stored in the associated memories 292-1 to 292-N. When the calculation is completed, the calculating sections 293-1 to 293-N supply the digital data signals representative of the calculating results and the identification to the judging section 294.

As described hereinbefore, the characteristic voice pattern of Taro's pronunciation was stored in the memory 292-1. The similarity calculated by the calculating section 293-1 is to be at the maximum and exceed the critical value. The judging section 294 determines that the speaker has the strongest resemblance to Taro. Then, the judging section 294 produces the digital data signal representative of the identification code ID1, and supplies the digital data signal to the GUI controller 283.

The GUI controller 283 supplies the digital data signal representative of the identification code ID1 to the database 283. With the digital data signal representative of the identification code ID1, the database 283 specifies the picture GUI1 customized by Taro, and supplies the digital image signal representative of the contents of the picture GUI1 to the GUI controller 286. The GUI controller 286 transfers the digital image signal to the display unit 282, and the picture GUI1 is produced on the display unit 282.

A non-registered user is assumed to pronounce the words "initial set-up". A characteristic voice pattern is extracted from the pronunciation, and is compared to with the characteristic voice patterns stored in the memories 292-1 to 292-N. Although the associated calculating sections 293-1 to 293-N calculate the similarity between the characteristic voice pattern of the speaker and the characteristic voice patterns stored in the associated memories 292-1 to 292-N, the calculation results are less than the critical value. The judging section 294 decides that the speaker is a non-registered user. The judging section 294 supplies the digital data signal representative of the identification code IDP to the GUI controller 286, and the GUI controller 286 searches the database for the standard picture GUIP. The digital image signal representative of the standard picture GUIP is transferred from the database 283 through the GUI controller 286 to the display unit 282, and the standard picture GUIP shown in FIG. 5A is produced on the display unit 282.

As will be understood from the foregoing description, either registered or non-registered user searches the database 283 for the picture customized by himself or herself by pronouncing the words toward the microphone 281. This means that the user does not repeat the manipulation before reaching the target picture. Upon reproduction of the picture, the user changes the controllable parameter in a moment. Thus, the electronic system 280 permits the player to change the controllable parameters such as, for example, the loudness, tempo, the reverb or chorus effect without any interruption of his performance.

Second Embodiment

Figure 8:
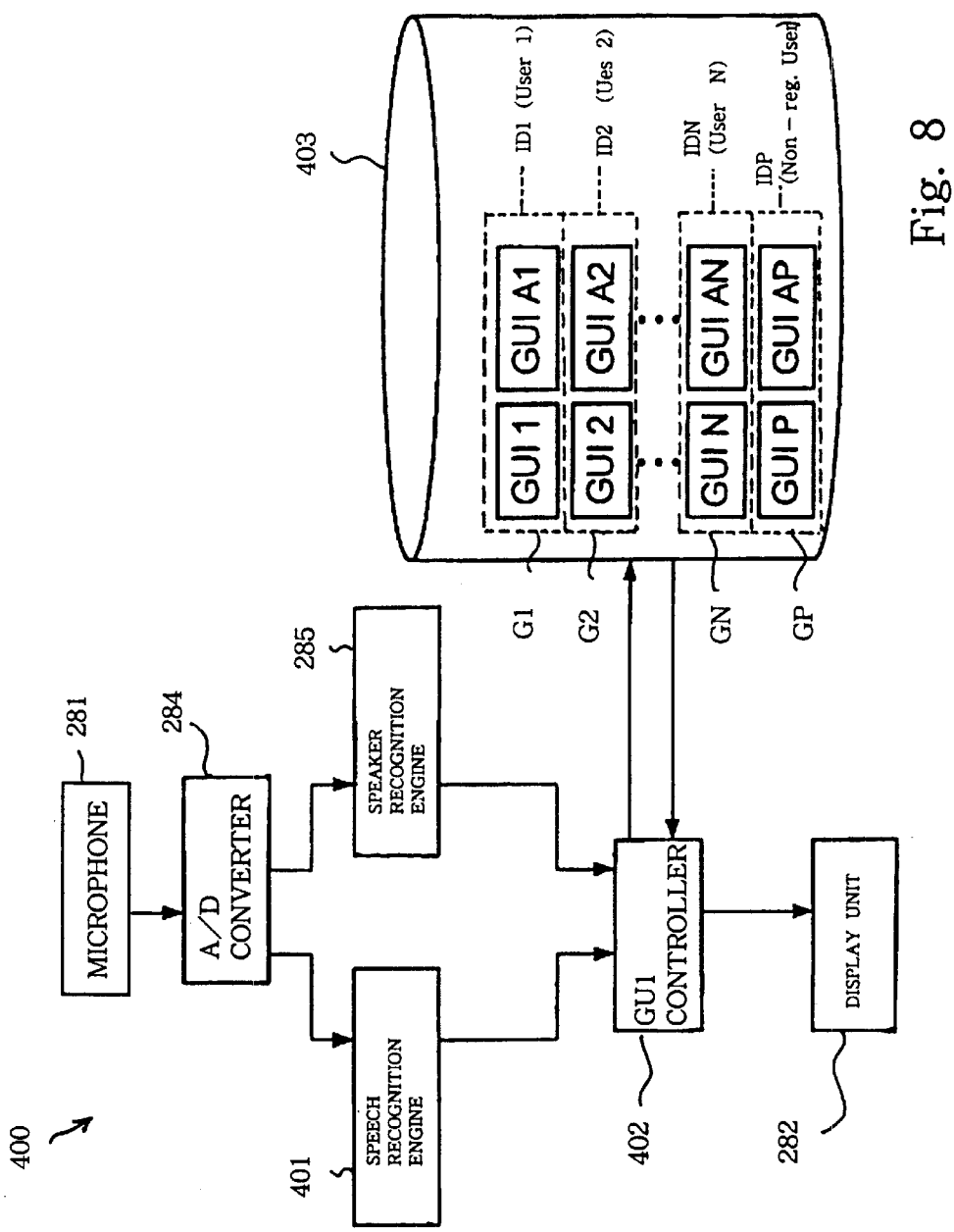
FIG. 8 is a block diagram showing the arrangement of an information processing subsystem incorporated in another keyboard musical instrument according to the present invention.

Turning to FIG. 8 of the drawings, an information processing subsystem 400 forms a part of an electronic system. The electronic system is incorporated in a keyboard musical instrument embodying the present invention. Although the electronic system further includes a key-switch array, a controller, a tone generator and a sound system, they are not shown in the figure. The controller may be identical with the controller 210 or specialized for generating electric tones only.

The information processing subsystem 400 includes a microphone 281, a display unit 282, an analog-to-digital converter 284, a speaker recognition engine 285, a speech recognition engine 401, a GUI controller 402 and a database 403. The microphone 281, the display unit 282, the analog-to-digital converter 284 and the speaker recognition engine 285 are similar to those of the information processing subsystem 280. For this reason, those components are labeled with the same references designating the corresponding components of the information processing subsystem 280 without detailed description. Although the manager 287, the graphic designer 288 and the messenger 289 are further incorporated in the information processing subsystem 400, they behave as similar to those in the information processing system 280, and are not shown in FIG. 8.

The speech recognition engine 401 is connected in parallel to the speaker recognition engine 285, and the digital voice signal is supplied from the analog-to digital converter 284 to the voice recognition engine 401 as well as the speaker recognition engine 285. The speech recognition engine 401 decides what words the speaker pronounces. The speech recognition engine 401 produces a digital data signal representative of the words pronounced by the speaker, and supplies the digital data signal to the GUI controller 402. The speaker recognition engine 285 identifies the speaker with one of the registered users, or determines that the speaker is a non-registered user as similar to that of the first embodiment. The speaker recognition engine 285 supplies the digital data signal representative of the identification code to the GUI controller 402.

Plural picture groups G1, G2, . . . , GN and GP are stored in the database 403. The picture groups G1 to GN are related to the identification codes ID1, ID2, IDN, which have been respectively assigned to user 1, user 2, . . . and user N. The pictures in each group G1, G2, . . . GN or GP are corresponding to particular words. The pictures GUI1, GUI2, . . . GUIN and GUIP are corresponding to the words "initial set-up". On the other hand, the pictures GUIA1, GUIA2, . . . GUIAN and GUIAP are corresponding to words "menu for performance". The pictures GUI1 to GUIN are customized by the users, respectively, as similar to those of the first embodiment. In this instance, the manager, the graphic designer and the messenger are involved in the customization of the pictures GUIA1 to GUIAP.

When the GUI controller 402 receives the digital data signal representative of the identification code and the digital data signal representative of the words pronounced by the speaker, the GUI controller 402 selects one of the picture groups G1 to GP assigned to the user or non-registered user by using an address representative of the identification code, and selects a particular kind of pictures such as GUI1–GUIP or GUIA1–GUIAP by using another address. Thus, the GUI controller 402 selects a picture from the database 403, and transfers the digital image signal representative of the selected picture to the display unit 282. Thus, the speech recognition engine 401 cooperates with the speaker recognition engine 285, and the GUI controller 402 causes the display unit 282 to produce a picture on the basis of the two kinds of voice recognition.

Figure 9:
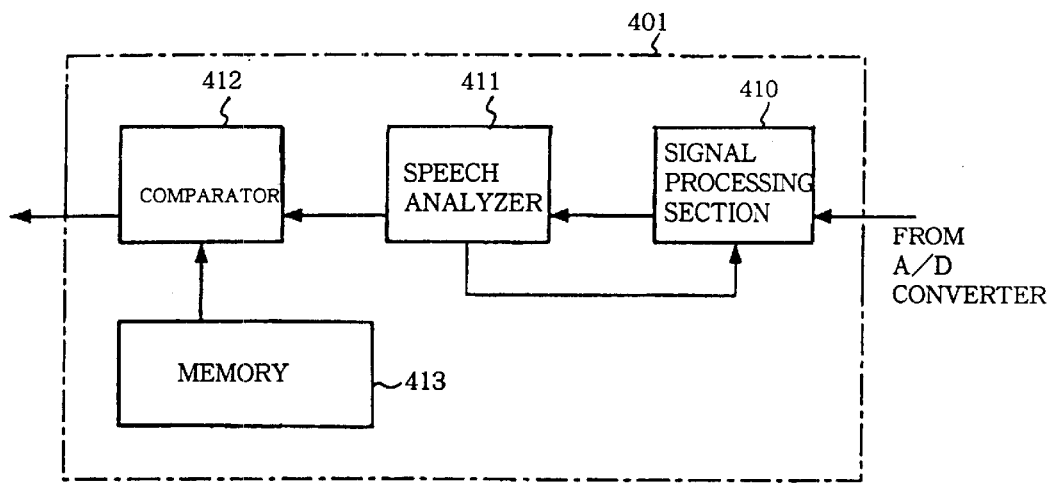
FIG. 9 is a block diagram showing the arrangement of a voice recognition engine incorporated in the information processing subsystem.

Though not shown in FIG. 8, the information processing subsystem 400 further includes a messenger and a manager corresponding the messenger 289 and the manager 287, and the messenger conveys instructions or commands from the speech recognition engine 401 to the manager. When the picture GUI1, . . . GUIN or GUIP is produced on the display unit 282, the user gives the commands for the controllable parameters to the messenger through the speech recognition engine 401. The user is assumed to increase the volume. The user pronounces word "volume" to the microphone 281, and the speech recognition engine 401 recognizes the pronunciation as "volume". Then, the messenger conveys the user's command "volume" to the manager, and the manager gets ready to change the volume. The manager may change the color of the visual image in the picture. Subsequently, the user pronounces word "increase" toward the microphone 281. The speech recognition engine 401 recognizes the pronunciation as word "increase", and the messenger conveys the command "increase" to the manager. The manager gradually turns the dial, and increments the pieces of acoustic data information representative of the loudness stored in an internal register together with the position of the dial. When the dial reaches an appropriate position, the user pronounces word "stop" toward the microphone 281, and the speech recognition engine 401 recognizes the pronunciation as word "stop". The messenger conveys the command "stop" to the manager. The manager stops the dial, and supplies the pieces of acoustic data information from the internal register to the controller. Thus, the speech recognition engine 401 is associated with the manager as well as the GUI controller 402. to The speech recognition engine 401 includes a signal processing section 410, a speech analyzer 411, the comparator 412 and a memory 413 as shown in FIG. 9. The analog-to-digital converter 284 is connected to the signal processing section 410, and the digital voice signal is supplied from the analog-to-digital converter 284 to the signal processing section 410. The speech analyzer 411 has instructed the signal processing section 410 to carry out a function, and the function is changeable. The signal processing section 410 supplies the digital acoustic signal to the speech analyzer 411 after the signal processing carried out along the given function.

The speech analyzer 411 has plural acoustic models, and pieces of acoustic data information representative of phonemes are fabricated into each of the acoustic models. When the digital acoustic signal reaches the speech analyzer 411, the speech analyzer 411 breaks the pronunciation into frames, and carries out a phoneme analysis on the frames so as to build a series of phonemes with a high possibility. The speech analyzer 411 checks an internal memory (not shown) to see whether or not the series of phonemes is corresponding to a word or words. If there is a word or words possibly corresponding to the series of phonemes, the speech analyzer 411 carries out a syntactic analysis by using language models for the word or words. The speech analyzer 411 decides a word, phrase or sentence, and supplies a digital data signal representative of the word, phrase or sentence to the comparator 412. The comparator 412 checks the memory to see what command/parameter the speaker gives to the information processing subsystem 40. The comparator 412 decides a command or controllable parameter at the highest possibility and other candidates expressed through the word, phrase or sentence. The comparator 412 produces the digital data signal representative of the command or controllable parameter and the other candidates in a format to be uniquely interpreted by the GUI controller 402 or the manager, and supplies the digital data signal to the GUI controller 402 or the messenger.

As will be understood from the foregoing description, the information processing subsystem 400 interprets the pronunciation of the speaker, and selects a picture to be produced on the display unit 282 from the database 403. It is not necessary for the user to repeat the manipulation on the panel. Moreover, the user can change the controllable parameters through the speech recognition. This means that, even if there are a lot of controllable parameters, the user can change an arbitrary controllable parameter without any interruption of his performance.

The information processing subsystem according to the present invention offers a wide variety of musical expression to musicians through the parameter change during the performance.

Third Embodiment

Figure 10:
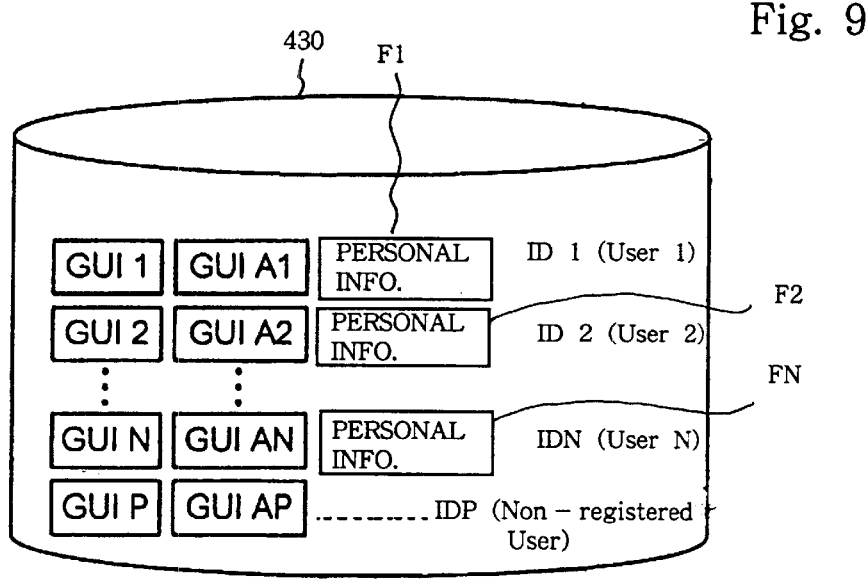
FIG. 10 is a block diagram showing a database of information processing subsystem incorporated in yet another musical instrument according to the present invention.

Turning to FIG. 10 of the drawings, pieces of personal information F1, F2, . . . and FN are incorporated in a database 430 together with the pictures GUI1 to GUIP and GUIA1 to GUIAP. The database 430 forms a part of an information processing system corresponding to the information processing system 400. The other system components are similar to those of the information processing system 400, and the description is not repeated for the sake of simplicity. The information processing system implementing the third embodiment is also incorporated in a musical instrument.

Figure 11:
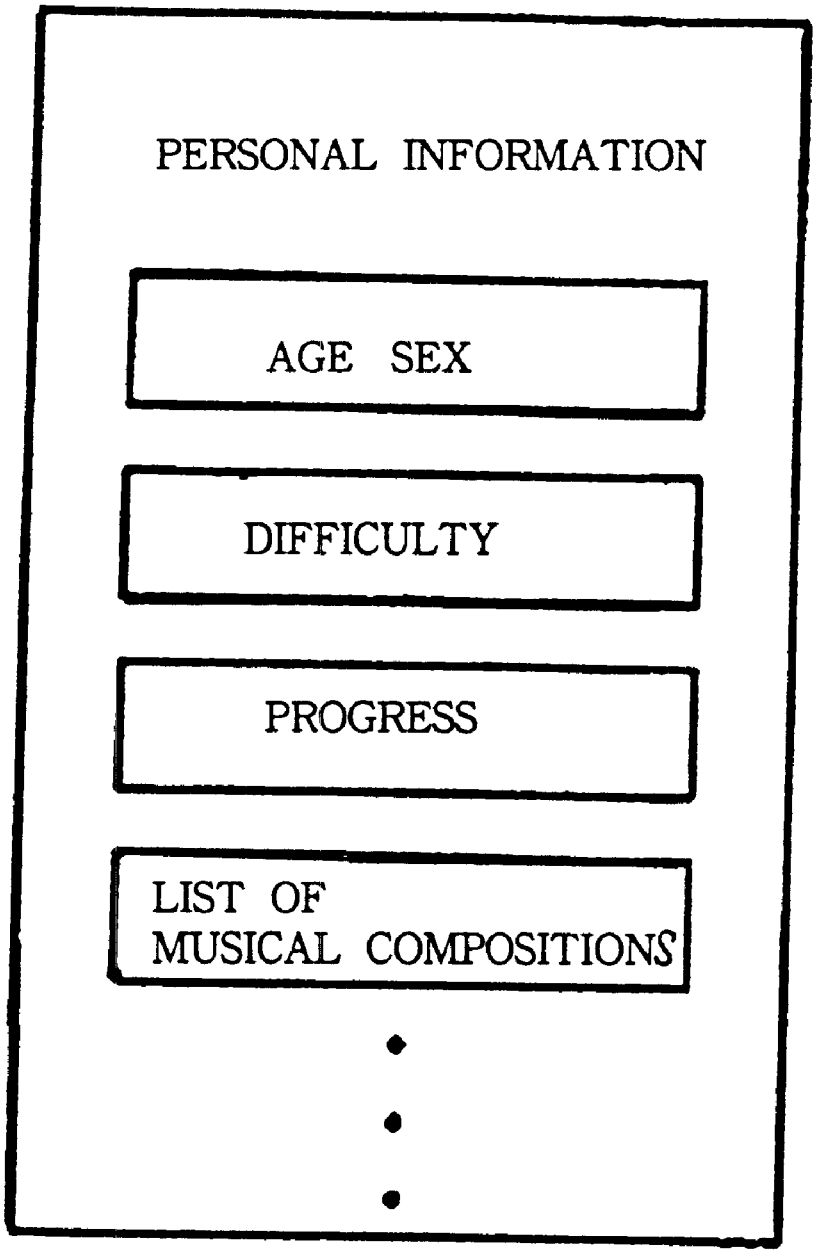
FIG. 11 is a view showing contents of a file for personal information.

The pieces of personal information F1 to FN are stored in personal files respectively assigned to the user ID1 to IDN, and are, by way of example, displayed on the screen together with the pictures GUI1 to GUIN. The pieces of personal information F1 to FN are customized by the users ID1 to IDN, respectively. One of the pieces of personal information F1 to FN is produced on the display unit as shown in FIG. 11. Age, sex, degree of difficulty, degree of progress are displayed together with a list of musical compositions recently practiced. Degrees of difficulty are selectively given to the music compositions, and average times of keyboard practice to be required for the music compositions are also estimated for the music compositions. The pieces of music data information representative of the degree and the average times are stored in the database 430 for each of the music compositions. When the user ID1, ID2, . . . or IDN specifies a music composition, the pieces of music data information representative of the degree and the average times are transferred to the file F1, F2, . . . or FN. The pieces of music data information representative of the degree of difficulty and the average times are displayed in the windows "DIFFICULTY" and "PROGRESS". The user would memorize how many times he has practiced the music composition, and compare his good memory with the average times in the window "PROGRESS". The manager may store the number of keyboard practices already carried out in the file F1, F2, . . . or FN so as to inform the user of the degree of progress.

Figure 12:
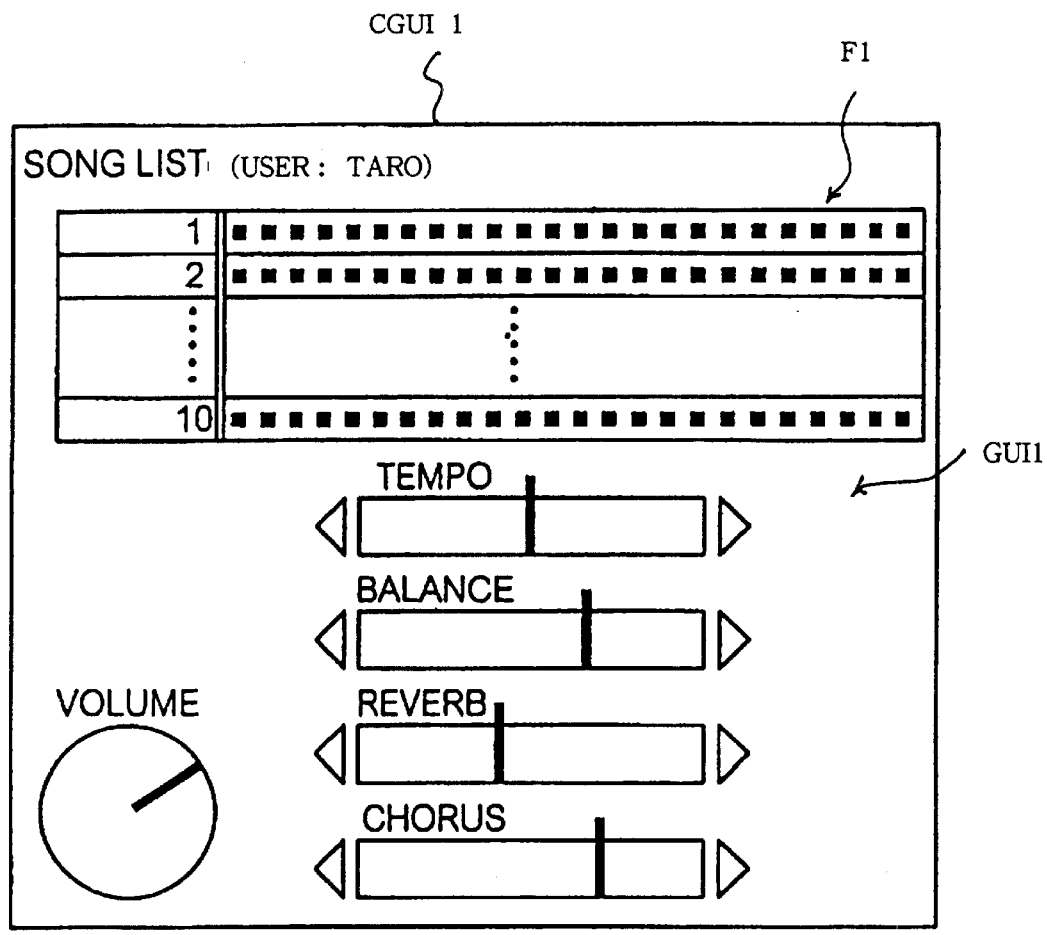
FIG. 12 is a view showing an arrangement of visual images in a composite picture.

When Taro pronounces the words "initial set-up", the speaker recognition engine identifies the speaker with Taro, and the speech recognition engine specifies the picture GUI1. Then, the GUI controller transfers the digital image signal representative of the picture GUI1 and the contents of the file F1 from the database 430 to the display unit, and a composite picture CGUI1 is produced on the display unit as shown in FIG. 12. An upper section of the display unit is assigned to the piece of personal information F1, and the picture GUI1 is produced in a lower section of the display unit.

It is desirable for the user to check the personal information for his progress. The piece of personal information representative of the degree of progress will encourage the user to repeat the practice as well as concentrate himself on the keyboard practice.

In the third embodiment, the pieces of personal information are also stored in the database, and are retrieved through the voice recognition technologies.

Fourth Embodiment

Figure 13:
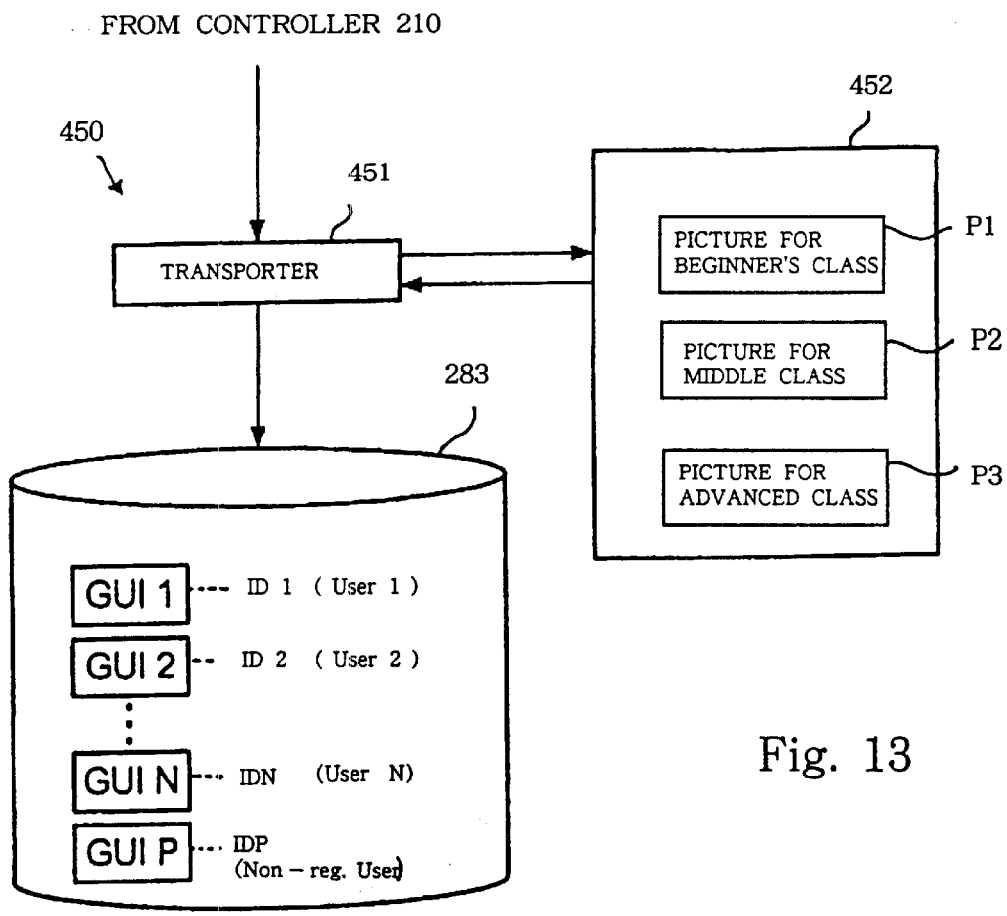
FIG. 13 is a block diagram showing the arrangement of an information processing subsystem incorporated in still another musical instrument according to the present invention.
Figure 14:
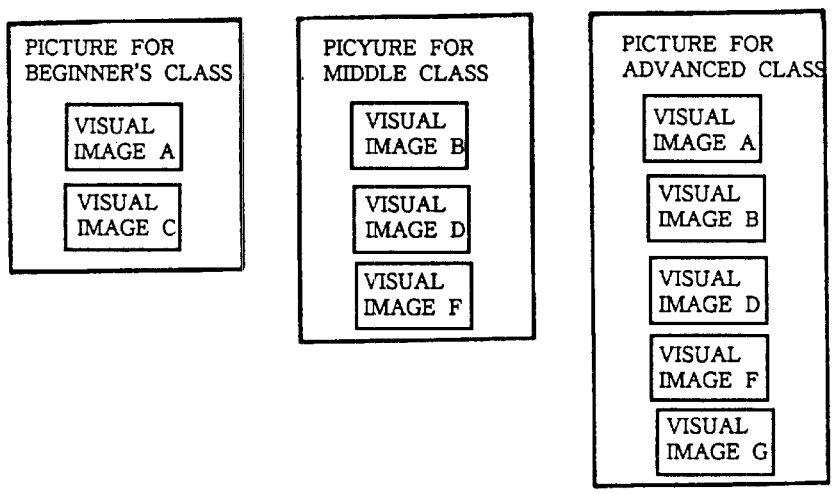
FIG. 14 is a view showing the contents of pictures stored in a database incorporated in the information processing subsystem.

FIG. 13 shows still another information processing subsystem 450. The information processing subsystem 450 is incorporated in a keyboard musical instrument. A transporter 451 and a memory 452 are newly added to the information processing subsystem 280. The transporter 451 is responsive to an instruction of the controller 210, and selectively writes a picture for beginner's class, a picture for middle class and a picture for advanced class into the database 283 as the picture GUI1, GUI2, . . . or GUIN. The picture for beginner's class, the picture for middle class and the picture for advanced class differently contain visual images as shown in FIG. 14. The picture for beginner's class is simpler than the picture for middle class, because the beginners create the music composition through simple tones. From this viewpoint, the picture for advanced class is the most complicated of all.

The skill of each user is managed by the controller 210. The controller 210 judges the skill on the basis of the amount of practice such as, for example, the rehearsal time per month, the number of practices for a music composition, the music composition currently practiced and the degree of consistency between the keys to be depressed on the music score and the keys detected by the key sensor 250 in the practice. The controller 210 produces a digital control signal representative of the skill, and supplies the digital control signal to the transporter 451. The transporter selects one of the pictures P1, P2 and P3 depending upon the skill, and transfers the digital image signal representative of the selected picture P1/P2/P3 from the memory 452 to the database 283. The selected picture P1/P2 or P3 is written into the database as the picture GUI1, GUI2, . . . GUIN.

Figure 15A:
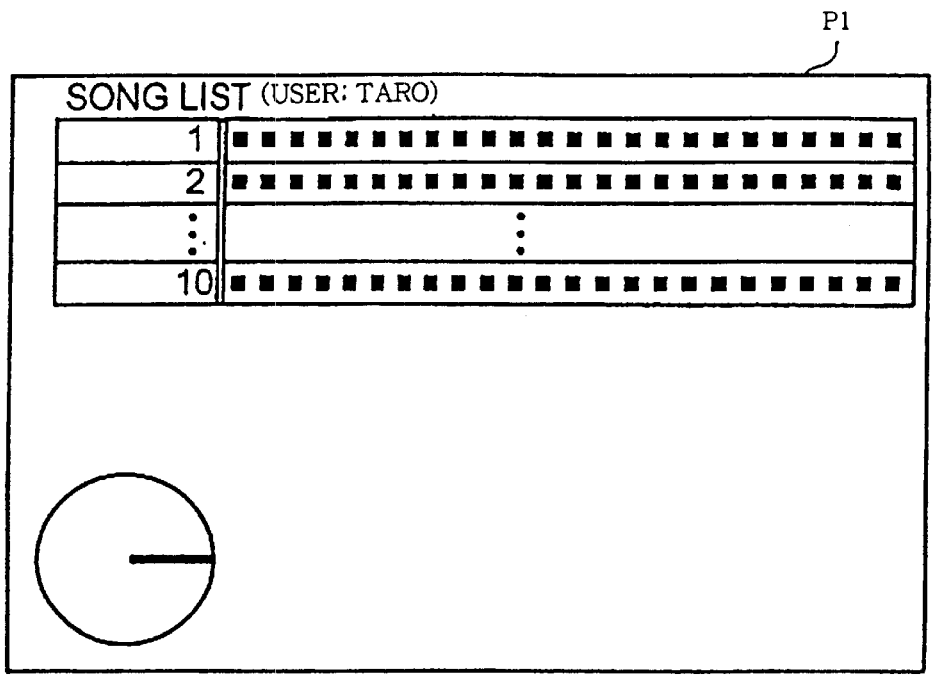
FIGS. 15A and 15B are views respectively showing a picture for beginners class and a picture for middle class.
Figure 15B:
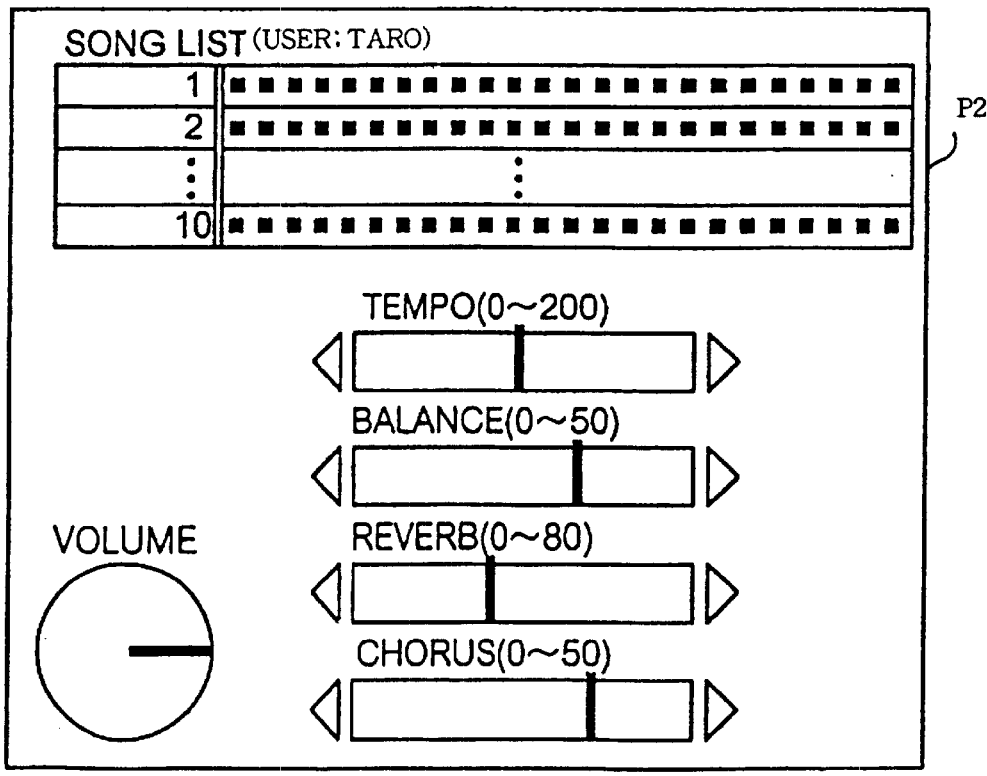

Assuming now that the controller 210 judges that the user Taro steps up from the beginner's class to the middle class, the transporter 451 transfers the digital image signal representative of the picture P2 from the memory 452 to the database 283. Then, the pieces of image data information representative of the picture P1 shown in FIG. 15A is replaced with the pieces of image data information representative of the picture P2 shown in FIG. 15B. The picture P1 only contains the personal information and the visual image of volume controller. However, the visual images of regulators "TEMPO", "BALANCE", "REVERB" and "CHORUS" are added to the picture P1. Thus, the picture P2 for middle class is more complicated than the picture P1 for beginner's class.

The information processing subsystem 450 prepares the semi-custom made pictures GUI1 to GUIN for the registered users depending upon their skills. Although the users do not need customizing their own pictures GUI1 to GUIN, the pictures GUI1 to GUIN are automatically changed depending upon the skills, and they call the semi-custom made pictures to the display unit through the speaker recognition engine.

In the first and fourth embodiments, the speaker recognition engine serves as a voice recognition engine. On the other hands, the speaker recognition engine and the speech recognition engine as a whole constitute the voice recognition engine in the second and third embodiments. The data base 283, 403 or 430 is corresponding to a memory, and the microphone 281 serves as a voice-to-signal converter. The messenger and the manager as a whole constitute a controller. The black/white keys 111/112 are corresponding to plural manipulators, and the acoustic piano 100, the controller 210, the servo-controller 220, the solenoid-operated key actuators 230, the memory 240, the key sensors 250, the tone generator 260 and the sound system 270 as a whole constitute a tone generating system. The controller 210, the key sensors 250, the tone generator 260 and the sound system 270 may form in combination the tone generating system.

As will be appreciated from the foregoing description, each registered user calls his own picture GUI1, GUI2, . . . or GUIN on the display unit through his voice, and the user easily assesses pieces of control data information appropriate thereto.

Moreover, the user can customize the picture, and quickly calls the customized picture on the display unit.

When the information processing system is used in a musical instrument, the user calls his own picture on the display unit through his voice, and changes the controllable parameters even in performance.

Although particular embodiments of the present invention have been shown and described, it will be apparent to those skilled in the art that various changes and modifications may be made without departing from the spirit and scope of the present invention.

The piece of personal information stored in each file F1, F2, . . . or FN may be automatically rewritten depending upon the number of practices in music.

A mail address and/or telephone code may form part of the personal information.

Users may specify the color of each visual image, the location of the visual image and languages such as English language or Japanese language in the picture.

The semi-custom made pictures P1 to P3 may be selectively transferred from the memory 452 to the database 283 by the users. In this instance, the user may input his or her skill into the controller 210.

When the controller 210 judges the skill, users age may be taken into account.

The controller may schedule user's practice such as, for example, a series of music compositions, to be practiced and the amount of practice per day. In this instance, the controller writes the schedule in the file' F1, F2, . . . or FN, and the GUI controller produces the image of schedule on the display unit together with the picture GUI1, GUI2, . . . or GUIN. Then, the user is motivated to practice the musical instrument.

The information processing system according to the present invention is available for all kinds of musical instruments. The information processing system is further applicable to any kind of electronic goods.

What is claimed is:

1. An information processing system comprising a memory having plural addressable locations where identification codes respectively assigned to plural users and plural pieces of visual data information representative of first pictures respectively owned by said plural users are stored, a voice-to-signal converter converting a pronunciation of a speaker to a first electric signal, a voice recognition engine connected to said voice-to-signal converter, responsive to said first electric signal so as to identify said speaker with one of said plural users and producing a second electric signal representative of said one of said plural users, a visual display unit responsive to a third electric signal for selectively producing said first pictures, and a graphical user interface connected to said voice recognition engine, said memory and said visual display unit, responsive to said second electric signal so as to produce a fourth electric signal representative of the identification code assigned to said one of said plural users and supplying said fourth electric signal to said memory for transferring said third electric signal representative of the first picture owned by said one of said plural users to said visual display unit.

2. The information processing system as set forth in claim 1, in which said voice recognition engine includes a speaker recognition engine for identifying said speaker with said one of said plural users for supplying said second electric signal to said graphical user interface and a speech recognition engine responsive to said first electric signal, so as to specify a meaning of said pronunciation for producing a fifth electric signal representative of said meaning, and said memory and said speech recognition engine are further connected to a controller which is responsive to said fifth electric signal so as selectively to change visual images incorporated in said first picture owned by said one of said plural users.

3. The information processing system as set forth in claim 1, in which other pieces of visual data information representative of second pictures are further stored in said memory, and in which said voice recognition engine includes a speaker recognition engine for identifying said speaker with said one of said plural users for supplying said second electric signal to said graphical user interface and a speech recognition engine responsive to said first electric signal so as to specify a meaning of said pronunciation for producing a fifth electric signal representative of said meaning, wherein said graphical user interface is responsive to said second electric signal and said fifth electric signal for selectively producing said third electric signal representative of one of said first and second pictures.

4. The information processing system as set forth in claim 3, in which said second pictures are respectively owned by said plural users so that said graphical user interface specifics said one of said first and second pictures by using the combination of said identification code and said meaning.

5. The information processing system as set forth in claim 1, in which another piece of visual data information representative of a standard picture is further stored in said memory for non-registered users assigned another identification code, and said voice recognition engine supplies said second electric signal representative of said non-registered users to said graphical user interface when said voice recognition engine can not identify said speaker with any one of said plural users, thereby causing said graphical user interface to supply said fourth electric signal representative of said another identification code.

6. The information processing system as set forth in claim 1, in which pieces of personal data information are further stored in said memory in connection with said. identification codes, respectively, and said graphical user interface transfers said third electric signal representative of said first picture and one of said pieces of personal data information both owned by said one of said plural users to said visual display unit for concurrently producing said first picture and images representing said one of said pieces of personal data information thereon.

7. An information processing system comprising
a memory having at least one addressable location where an identification code assigned to a user and a piece of visual data information representative of a certain picture customized by said plural users are stored,
a voice-to-signal converter converting a pronunciation of a speaker to a first electric signal,
a voice recognition engine connected to said voice-to-signal converter and responsive to said first electric signal so as to produce a second electric signal representative of said user when said speaker is identified with said user,
a visual display unit responsive to a third electric signal for selectively producing pictures, and
a graphical user interface connected to said voice recognition engine, said memory and said visual display unit, responsive to said second electric signal so as to produce a fourth electric signal representative of the identification code assigned to said user and supplying said fourth electric signal to said memory for transferring said third electric signal representative of said certain picture to said visual display unit.

8. The information processing system as set forth in claim 7, in which said voice recognition engine includes a speaker recognition engine for identifying said speaker with said user for supplying said second electric signal to said graphical user interface and a speech recognition engine responsive to said first electric signal so as to specify a meaning of said pronunciation for producing a fifth electric signal representative of said meaning, and said memory and said speech recognition engine are further connected to a controller which is responsive to said fifth electric signal so as selectively to change visual images incorporated in said certain picture.

9. The information processing system as set forth in claim 7, in which another piece of visual data information representative of another picture is further stored in said memory, and in which said voice recognition engine includes a speaker recognition engine for identifying said speaker with said user for supplying said second electric signal to said graphical user interface and a speech recognition engine responsive to said first electric signal so as to specify a meaning of said pronunciation for producing a fifth electric signal representative of said meaning, wherein said graphical user interface is responsive to said second electric signal and said fifth electric signal for selectively producing said third electric signal representative of one of said certain picture and said another picture.

10. The information processing system as set forth in claim 7, in which another piece of visual data information representative of a standard picture is further stored in said memory for non-registered users assigned another identification code, and said voice recognition engine supplies said second electric signal representative of said non-registered users to said graphical user interface when said voice recognition engine can not identify said speaker with said user, thereby causing said graphical user interface to supply said fourth electric signal representative of said another identification code.

11. The information processing system as set forth in claim 7, in which a piece of personal data information is further stored in said memory in connection with said identification code, and said graphical user interface transfers said third electric signal representative of said certain picture and said piece of personal data information both owned by said user to said visual display unit for concurrently producing said first picture and images representing said piece of personal data information thereon.

12. An information processing system used for a musical instrument for assisting a player in selecting at least one attribute of tones to be generated, comprising:
a memory having plural addressable locations where identification codes respectively assigned to plural users and plural pieces of visual data information representative of first pictures respectively owned by said plural users are stored, each of said first pictures including at least one visual image indicating the current state of said at least one attribute;
a voice-to-signal converter converting a pronunciation of said player to a first electric signal;
a voice recognition engine connected to said voice-to-signal converter, responsive to said first electric signal so as to identify said player with one of said plural users and producing a second electric signal representative of said one of said plural users;
a visual display unit responsive to a third electric signal for selectively producing said first pictures; and
a graphical user interface connected to said voice recognition engine, said memory and said visual display unit, responsive to said second electric signal so as to produce a fourth electric signal representative of the identification code assigned to said one of said plural users and supplying said fourth electric signal to said memory for transferring said third electric signal representative of the first picture owned by said one of said plural users to said visual display unit.

13. The information processing system as set forth in claim 12, in which said voice recognition engine includes a speaker recognition engine for identifying said speaker with said one of said plural users for supplying said second electric signal to said graphical user interface and a speech recognition engine responsive to said first electric signal so as to specify a meaning of said pronunciation for producing a fifth electric signal representative of said meaning, and said memory and said speech recognition engine are further connected to a controller which is responsive to said fifth electric signal so as selectively to change said current state represented by said at least one visual image.

14. The information processing system as set forth in claim 12, in which other pieces of visual data information representative of second pictures are further stored in said memory, and in which said voice recognition engine includes a speaker recognition engine for identifying said player with said one of said plural users for supplying said second electric signal to said graphical user interface and a speech recognition engine responsive to said first electric signal so as to specify a meaning of said pronunciation for producing a fifth electric signal representative of said meaning, wherein said graphical user interface is responsive to said second electric signal and said fifth electric signal for selectively producing said third electric signal representative of one of said first and second pictures.

15. The information processing system as set forth in claim 14, in which said second pictures are respectively owned by said plural users so that said graphical user interface specifies said one of said first and second pictures by using the combination of said identification code and said meaning.

16. The information processing system as set forth in claim 12, in which another piece of visual data information representative of a standard picture including said at least one visual image is further stored in said memory for non-registered users assigned another identification code, and said voice recognition engine supplies said second electric signal representative of said non-registered users to said graphical user interface when said voice recognition engine can not identify said player with any one of said plural users, thereby causing said graphical user interface to supply said fourth electric signal representative of said another identification code.

17. The information processing system as set forth in claim 12, in which pieces of personal data information are further stored in said memory in connection with said identification codes, respectively, and said graphical user interface transfers said third electric signal representative of said first picture and one of said pieces of personal data information both owned by said one of said plural users to said visual display unit for concurrently producing said first picture and images representing said one of said pieces of personal data information thereon.

18. The information processing system as set forth in claim 12, in which said first pictures are customized by said plural users, respectively.

19. The information processing system as set forth in claim 12, in which said.

20. The information processing system as set forth in claim 19, in which another of said first pictures further includes another visual image representing another attribute of said tones selected from the group consisting of tempo, balance, reverb and chorus effect.

21. The information processing system as set forth in claim 12, further comprising another memory for storing of visual data information representative of prdetermined pictures appropriate to a beginner's class, a middle class and an advanced class, and a controller judging current skill of said plural users so as selectively to transfer said pieces of visual data information from said another memory to said memory depending upon the skill of said plural users for storing said predetermined pictures as said first pictures.

22. A musical instrument for producing tones, comprising:
plural manipulators for specifying notes of a scale;
a tone generating system responsive to fingering on said plural manipulators for generating tones with the notes specified through said fingering; and
an information processing system connected to said tone generating system, and including
a memory having plural addressable locations where identification codes respectively assigned to plural users and plural pieces of visual data information representative of first pictures respectively owned by said plural users are stored, each of said first pictures including at least one visual image indicating the current state of said at least one attribute of said tones,
a voice-to-signal converter converting a pronunciation of said player to a first electric signal,
a voice recognition engine connected to said voice-to-signal converter, responsive to said first electric signal so as to identify said player with one of said plural users and producing a second electric signal representative of said one of said plural users,
a visual display unit responsive to a third electric signal for selectively producing said first pictures and
a graphical user interface connected to said voice recognition engine, said memory and said visual display unit, responsive to said second electric signal so as to produce a fourth electric signal representative of the identification code assigned to said one of said plural users and supplying said fourth electric signal to said memory for transferring said third electric signal representative of the first picture owned by said one of said plural users to said visual display unit.

23. The musical instrument as set forth in claim 22, in which said voice recognition engine includes a speaker recognition engine for identifying said speaker with said one of said plural users for supplying said second electric signal to said graphical user interface and a speech recognition engine responsive to said first electric signal so as to specify a meaning of said pronunciation for producing a fifth electric signal representative of said meaning, and said memory and said speech recognition engine are further connected to a controller which is responsive to said fifth electric signal so as selectively to change said current state represented by said at least one visual image.

24. The musical instrument as set forth in claim 22, in which other pieces of visual data information representative of second pictures are further stored in said memory, and in which said voice recognition engine includes a speaker recognition engine for identifying said player with said one of said plural users for supplying said second electric signal to said graphical user interface and a speech recognition engine responsive to said first electric signal so as to specify a meaning of said pronunciation for producing a fifth electric signal representative of said meaning, wherein said graphical user interface is responsive to said second electric signal and said fifth electric signal for selectively producing said third electric signal representative of one of said first and second pictures.

25. The musical instrument as set forth in claim 24, in which said second pictures are respectively owned by said plural users so that said graphical user interface specifies said one of said first and second pictures by using the combination of said identification code and said meaning.

26. The musical instrument as set forth in claim 22, in which another piece of visual data information representative of a standard picture including said at least one visual image is further stored in said memory for non-registered users assigned another identification code, and said voice recognition engine supplies said second electric signal representative of said non-registered users to said graphical user interface when said voice recognition engine can not identify said player with any one of said plural users, thereby causing said graphical user interface to supply said fourth electric signal representative of said another identification code.

27. The musical instrument as set forth in claim 22, in which pieces of personal data information are further stored in said memory in connection with said identification codes, respectively, and said graphical user interface transfers said third electric signal representative of said picture and one of said pieces of personal data information both owned by said one of said plural users to said visual display unit for concurrently producing said first picture and images representing said one of said pieces of personal data information thereon.

28. The musical instrument as set forth in claim 22, in which said at least one attribute is volume of said tones.

29. The musical instrument as set forth in claim 28, in which another of said first pictures further includes another visual image representing another attribute of said tones selected from the group consisting of tempo, balance, reverb and chorus effect.

30. The musical instrument as set forth in claim 22, in which said tone generating system includes
plural strings struck with hammers in response to said fingering on said plural manipulators for generating acoustic tones, and
an electronic tone generating electronic tones independent of said acoustic tones.

* * * * *